US011865809B2

(12) United States Patent
Matsen et al.

(10) Patent No.: US 11,865,809 B2
(45) Date of Patent: Jan. 9, 2024

(54) METHOD FOR FORMING NON-BONDED REGIONS IN MULTI-LAYERED METALLIC ARMOR

(71) Applicant: The Boeing Company, Chicago, IL (US)

(72) Inventors: Marc R. Matsen, Seattle, WA (US); Mark A. Negley, Kirkland, WA (US); Landon K. Henson, Snoqualmie, WA (US); John R. Hull, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 482 days.

(21) Appl. No.: 16/548,657

(22) Filed: Aug. 22, 2019

(65) Prior Publication Data

US 2021/0101365 A1  Apr. 8, 2021

(51) Int. Cl.
*B23K 15/04* (2006.01)
*B32B 15/04* (2006.01)
(Continued)

(52) U.S. Cl.
CPC ............... *B32B 15/04* (2013.01); *B23K 9/23* (2013.01); *B23K 20/008* (2013.01); *B23K 20/02* (2013.01);
(Continued)

(58) Field of Classification Search
CPC ...... B23K 20/008; B23K 20/02; B23K 20/18; B23K 9/23; B32B 15/011; B32B 15/04;
(Continued)

(56) References Cited

U.S. PATENT DOCUMENTS 2,372,607 A * 3/1945 Schwarzkopf ............ B22F 7/08
                                                75/238
2,445,801 A * 7/1948 Partiot .................. B23K 11/002
                                                89/36.02
(Continued)

FOREIGN PATENT DOCUMENTS

DE   19928370 A1 * 1/2001 ............. F41H 5/023
GB   2560509        9/2018
(Continued)

OTHER PUBLICATIONS

Extended European Search Report for European Patent Application No. 20171501.8 dated Oct. 1, 2020.
U.S. Appl. No. 15/923,902, filed Mar. 16, 2018.

*Primary Examiner* — Erin B Saad
*Assistant Examiner* — Carlos J Gamino
(74) *Attorney, Agent, or Firm* — Kunzler Bean & Adamson

(57) ABSTRACT

Disclosed herein is a method of forming a multi-layered metallic part. The method comprises stacking at least two metallic layers, each made of a metallic material having a ductility, to form a multi-layered metallic assembly. The method also comprises interposing a diffusion-bond preventing element directly between adjacent ones of the at least two metallic layers of the multi-layered metallic assembly. The method further comprises diffusion bonding the at least two metallic layers to each other at locations other than a location contiguous with the diffusion-bond preventing element to produce a multi-layered metallic part having a non-bonded region between the at least two metallic layers at the location of the diffusion-bond preventing element.

20 Claims, 12 Drawing Sheets

(51) Int. Cl.
*B32B 7/05* (2019.01)
*B32B 5/16* (2006.01)
*B32B 7/08* (2019.01)
*B23K 9/23* (2006.01)
*B23K 20/02* (2006.01)
*B23K 20/18* (2006.01)
*B23K 20/00* (2006.01)
*B32B 18/00* (2006.01)

(52) U.S. Cl.
CPC ............ *B23K 20/18* (2013.01); *B32B 5/16* (2013.01); *B32B 7/05* (2019.01); *B32B 7/08* (2013.01); *B32B 18/00* (2013.01); *B32B 2307/304* (2013.01); *B32B 2307/54* (2013.01); *Y10S 228/00* (2013.01)

(58) Field of Classification Search
CPC .......... B32B 18/00; B32B 2307/304; B32B 2307/54; B32B 5/16; B32B 7/05; B32B 7/08; C22C 38/00; F41H 5/045; F41H 5/023; F41H 5/0492; Y10S 228/00
See application file for complete search history.

(56) References Cited

U.S. PATENT DOCUMENTS

| | | | | |
|---|---|---|---|---|
| 3,419,952 A * | 1/1969 | Carlson | ........... | C22C 47/20 428/614 |
| 3,563,836 A * | 2/1971 | Dunbar | ........... | F41H 5/0457 428/407 |
| 3,653,110 A * | 4/1972 | King, Jr. | ........... | F01D 5/28 416/223 R |
| 3,874,855 A * | 4/1975 | Legrand | ........... | F41H 5/0492 428/614 |
| 4,043,498 A * | 8/1977 | Conn, Jr. | ........... | B23K 11/0093 416/213 A |
| 4,319,708 A * | 3/1982 | Lomerson | ........... | H05K 3/4084 29/853 |
| 5,118,026 A * | 6/1992 | Stacher | ........... | B21D 26/055 228/262.71 |
| 5,330,093 A * | 7/1994 | Bottomley | ........... | B21D 26/055 228/262.71 |
| H1434 H * | 5/1995 | Cytron | ........... | 89/36.02 |
| 5,654,518 A * | 8/1997 | Dobbs | ........... | B64D 7/00 89/36.02 |
| 5,686,689 A * | 11/1997 | Snedeker | ........... | F41H 5/023 89/36.02 |
| 5,804,757 A * | 9/1998 | Wynne | ........... | F41H 5/0428 2/2.5 |
| 6,138,898 A * | 10/2000 | Will | ........... | B21D 47/00 29/897 |
| 6,635,357 B2 * | 10/2003 | Moxson | ........... | B22F 3/26 428/568 |
| 6,745,661 B1 * | 6/2004 | Neal | ........... | B32B 9/047 89/36.02 |
| 6,913,802 B1 * | 7/2005 | Plant | ........... | A41D 31/285 428/36.1 |
| 7,157,158 B2 * | 1/2007 | Collier | ........... | C04B 35/584 428/698 |
| 7,507,312 B2 | 3/2009 | Bossi et al. | | |
| 8,343,402 B1 | 1/2013 | Matsen et al. | | |
| 8,434,396 B1 * | 5/2013 | Wiley | ........... | F41H 5/013 89/36.01 |
| 8,556,619 B2 | 10/2013 | Matsen et al. | | |
| 8,757,041 B1 * | 6/2014 | Gillen | ........... | F41H 5/045 2/2.5 |
| 9,457,404 B2 | 10/2016 | Matsen et al. | | |
| 9,677,858 B1 * | 6/2017 | Speyer | ........... | F41H 5/04 |
| 9,856,547 B2 * | 1/2018 | Xu | ........... | C22C 32/00 |
| 9,930,729 B2 | 3/2018 | Matsen et al. | | |
| 10,966,292 B2 * | 3/2021 | Matsen | ........... | H05B 6/14 |
| 11,047,651 B2 * | 6/2021 | Speyer | ........... | F41H 5/0492 |
| 2004/0020353 A1 * | 2/2004 | Ravid | ........... | F41H 5/0492 89/36.02 |
| 2006/0105184 A1 * | 5/2006 | Palicka | ........... | F41H 5/0414 428/614 |
| 2006/0266207 A1 | 11/2006 | Cerny et al. | | |
| 2007/0144111 A1 * | 6/2007 | Kennedy | ........... | B32B 15/02 52/783.17 |
| 2008/0138584 A1 * | 6/2008 | Grose | ........... | B32B 5/12 428/156 |
| 2009/0087681 A1 * | 4/2009 | Decker | ........... | F41H 5/0442 428/653 |
| 2009/0114082 A1 * | 5/2009 | Hunn | ........... | F41H 5/0421 89/36.02 |
| 2010/0055491 A1 * | 3/2010 | Vecchio | ........... | B23K 20/023 428/614 |
| 2010/0297463 A1 * | 11/2010 | Hoffstaedter | ........... | B23K 20/2336 148/531 |
| 2011/0220280 A1 * | 9/2011 | DiPietro | ........... | F41H 5/0492 156/285 |
| 2012/0246788 A1 * | 10/2012 | Harrell | ........... | A41D 13/0155 2/243.1 |
| 2015/0354924 A1 | 12/2015 | Micarelli | | |
| 2017/0082405 A1 * | 3/2017 | Lualdi | ........... | F41H 5/0464 |
| 2019/0003806 A1 * | 1/2019 | Gajdzinski | ........... | B32B 15/14 |
| 2019/0344470 A1 * | 11/2019 | Findley | ........... | C01B 32/963 |

FOREIGN PATENT DOCUMENTS

WO WO-2004109217 A1 * 12/2004 ............ F41H 5/0485
WO 2006137823 12/2006

* cited by examiner

METHOD FOR FORMING NON-BONDED REGIONS IN MULTI-LAYERED METALLIC ARMOR

FIELD

This disclosure relates generally to forming a multi-layered metallic part, and more particularly to controlling crack propagations in multi-layered metallic parts, such as caused by impacts with a projectile.

BACKGROUND

High-strength materials, such as hardened steel, are used in a variety of applications. In one application, high-strength steel plates are used as armor for vehicles, weapons, personnel, structures, and the like. Desirably, high-strength steel plates are thick and strong in order to withstand powerful impacts, which makes the formation of such steel plates into desired shapes difficult. Additionally, dissipating or controlling cracks propagating through parts made of multiple metallic layers can be difficult.

SUMMARY

The subject matter of the present application provides examples of methods and systems for forming a multi-layered metallic part and corresponding multi-layered metallic parts that overcome the above-discussed shortcomings of prior art techniques. The subject matter of the present application has been developed in response to the present state of the art, and in particular, in response to shortcomings of conventional high-strength metallic parts, such as high-strength steel plates, and the conventional methods and systems for forming such parts.

Disclosed herein is a method of forming a multi-layered metallic part. The method comprises stacking at least two metallic layers, each made of a metallic material having a ductility, to form a multi-layered metallic assembly. The method also comprises interposing a diffusion-bond preventing element directly between adjacent ones of the at least two metallic layers of the multi-layered metallic assembly. The method further comprises diffusion bonding the at least two metallic layers to each other at locations other than a location contiguous with the diffusion-bond preventing element to produce a multi-layered metallic part having a non-bonded region between the at least two metallic layers at the location of the diffusion-bond preventing element. The preceding subject matter of this paragraph characterizes example 1 of the present disclosure.

The metallic material of the adjacent ones of the at least two metallic layers has the same ductility. The preceding subject matter of this paragraph characterizes example 2 of the present disclosure, wherein example 2 also includes the subject matter according to example 1, above.

The adjacent ones of the at least two metallic layers comprise a first metallic layer and a second metallic layer, and the metallic material of the second metallic layer has a lower ductility than the metallic material of the first metallic layer. The preceding subject matter of this paragraph characterizes example 3 of the present disclosure, wherein example 3 also includes the subject matter according to any one of examples 1-2, above.

The second metallic layer is a high-strength layer made of a powdered metallic material. The preceding subject matter of this paragraph characterizes example 4 of the present disclosure, wherein example 4 also includes the subject matter according to example 3, above.

The method further comprises attaching the diffusion-bond preventing element to one of the at least two metallic layers before stacking the at least two metallic layers. The preceding subject matter of this paragraph characterizes example 5 of the present disclosure, wherein example 5 also includes the subject matter according to any one of examples 1-4, above.

The step of attaching the diffusion-bond preventing element to the one of the at least two metallic layers comprises welding the diffusion-bond preventing element to the one of the at least two metallic layers. The preceding subject matter of this paragraph characterizes example 6 of the present disclosure, wherein example 6 also includes the subject matter according to example 5, above.

The step of attaching the diffusion-bond preventing element to the one of the at least two metallic layers comprises printing the diffusion-bond preventing element onto the one of the at least two metallic layers. The preceding subject matter of this paragraph characterizes example 7 of the present disclosure, wherein example 7 also includes the subject matter according to example 5, above.

The diffusion-bond preventing element comprises a thermally insulating material. The preceding subject matter of this paragraph characterizes example 8 of the present disclosure, wherein example 8 also includes the subject matter according to any one of examples 1-7, above.

The thermally insulating material comprises one or more of boron nitride and yttrium oxide. The preceding subject matter of this paragraph characterizes example 9 of the present disclosure, wherein example 9 also includes the subject matter according to example 8, above.

The diffusion-bond preventing element further comprises a metallic housing encapsulating the thermally insulating material. The preceding subject matter of this paragraph characterizes example 10 of the present disclosure, wherein example 10 also includes the subject matter according to any one of examples 8-9, above.

The method further comprises interposing a plurality of diffusion-bond preventing elements, spaced apart from each other, directly between the adjacent ones of the at least two metallic layers of the multi-layered metallic assembly. The multi-layered metallic part has a plurality of non-bonded regions, spaced apart from each other, between the at least two metallic layers at the locations of the plurality of diffusion-bond preventing elements. The preceding subject matter of this paragraph characterizes example 11 of the present disclosure, wherein example 11 also includes the subject matter according to any one of examples 1-10, above.

The plurality of non-diffusion-bonded regions are arranged relative to each other according to a predetermined fracture path through at least one of the at least two metallic layers. The preceding subject matter of this paragraph characterizes example 12 of the present disclosure, wherein example 12 also includes the subject matter according to example 11, above.

Further disclosed herein is a multi-layered metallic part. The multi-layered metallic part comprises a ductile layer, made of a first metallic material having a first ductility. The multi-layered metallic part also comprises a high-strength layer, made of a second metallic material having a second ductility lower than the first ductility. Portions of the ductile layer and the high-strength layer are diffusion bonded together. The multi-layered metallic part further comprises a non-diffusion-bonded region, directly between the ductile layer and the high-strength layer. The preceding subject matter of this paragraph characterizes example 13 of the present disclosure.

The non-diffusion-bonded region comprises a non-metallic thermally insulating material. The preceding subject matter of this paragraph characterizes example 14 of the present disclosure, wherein example 14 also includes the subject matter according to example 13, above.

The thermally insulating material comprises one or more of boron nitride and yttrium oxide. The preceding subject matter of this paragraph characterizes example 15 of the present disclosure, wherein example 15 also includes the subject matter according to example 14, above.

The thermally insulating material comprises a ceramic material. The preceding subject matter of this paragraph characterizes example 16 of the present disclosure, wherein example 16 also includes the subject matter according to example 13, above.

The multi-layered metallic part further comprises a plurality of non-diffusion-bonded regions, spaced apart from each other and each directly between the ductile layer and the high-strength layer. The preceding subject matter of this paragraph characterizes example 17 of the present disclosure, wherein example 17 also includes the subject matter according to any one of examples 13-16, above.

At least one non-diffusion-bonded region of the plurality of non-diffusion-bonded regions has a first maximum dimension. At least one non-diffusion-bonded region of the plurality of non-diffusion-bonded regions has a second maximum dimension. The first maximum dimension is different than the second maximum dimension. The preceding subject matter of this paragraph characterizes example 18 of the present disclosure, wherein example 18 also includes the subject matter according to example 17, above.

The plurality of non-diffusion-bonded regions are arranged relative to each other according to a predetermined fracture path through the multi-layered metallic part. The preceding subject matter of this paragraph characterizes example 19 of the present disclosure, wherein example 19 also includes the subject matter according to any one of examples 17-18, above.

The multi-layered metallic part further comprises a plurality of ductile layers made of the first metallic material. The multi-layered metallic part also comprises a plurality of high-strength layers made of the second metallic material. The multi-layered metallic part additionally comprises a plurality of non-diffusion-bonded regions. The multi-layered metallic part alternates between ductile layer and high-strength layer across a thickness of the multi-layered metallic part. A portion of each ductile layer of the plurality of ductile layers is diffusion bonded to a portion of at least one adjacent high-strength layer of the plurality of high-strength layers. At least one of the plurality of non-diffusion-bonded regions is interposed between each one of the plurality of ductile layers and an adjacent one of the plurality of high-strength layers. The preceding subject matter of this paragraph characterizes example 20 of the present disclosure, wherein example 20 also includes the subject matter according to any one of examples 13-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are multi-layered metallic parts having multiple layers diffusion bonded together and some non-diffusion-bonded regions at strategic locations between the layers of the parts. In the context of armor, the multiple layers promote the capture of fractured pieces of a projectile, while the non-diffusion-bonded regions help to constrain the propagation of cracks initiated by an impact from the projectile.

Figure 1:
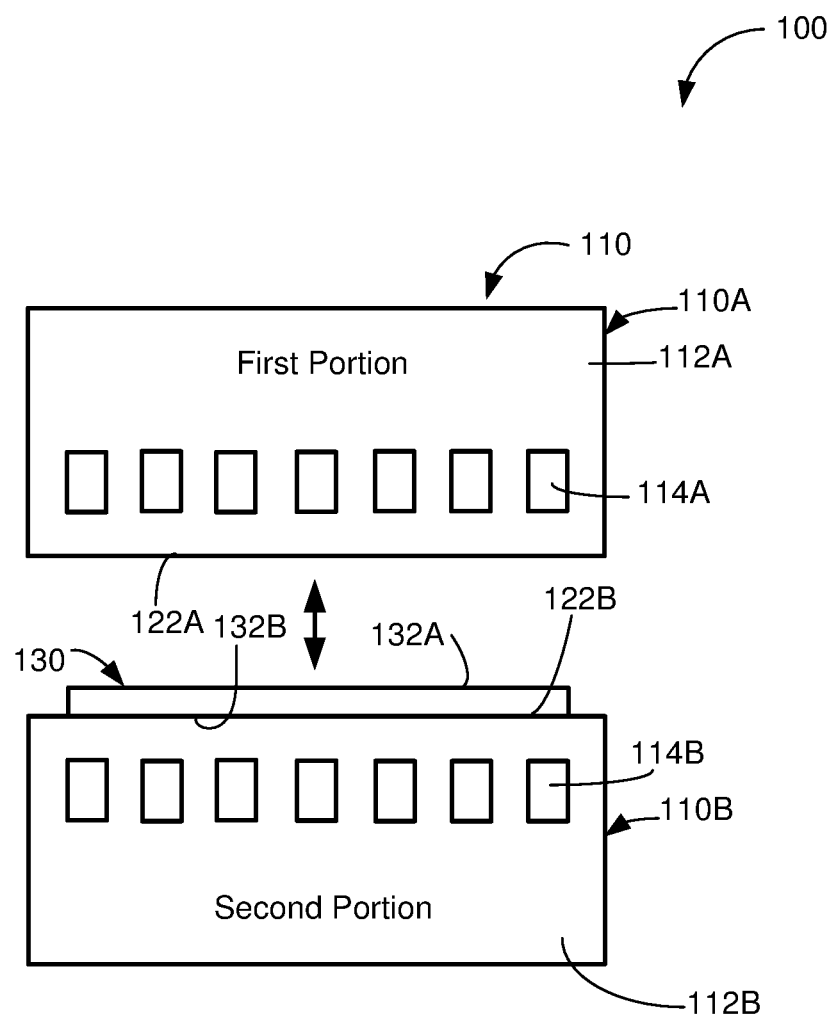
FIG. 1 is a schematic side view of a system for forming a multi-layered metallic assembly into a multi-layered metallic part, according to one or more examples of the present disclosure.

The multi-layered metallic parts described herein can be formed using any of various systems and methods. One such system is schematically illustrated in FIG. 1. According to the example in FIG. 1, the system 100 is configured to form a multi-layered metallic assembly 130 into a multi-layered metallic part 131 (see, e.g., FIG. 5). The system 100 includes an apparatus 110 having a first portion 110A and a second portion 110B. The first portion 110A and the second portion 110B are movable relative to each other. Movement of the first portion 110A and the second portion 110B relative to each other can be facilitated by one or more actuators, as is known in the art. In some implementations, the first portion 110A includes an upper die 112A and the second portion 110B includes a lower die 112B.

In certain examples, the first portion 110A additionally includes a plurality of electromagnetic coils 114A and the second portion 110B additionally includes a plurality of electromagnetic coils 114B. The electromagnetic coils 114A, 114B are coupled to the upper die 112A and the lower die 112B, respectively. In some examples, the electromagnetic coils 114A, 114B are operable to help heat the upper die 112A and the lower die 112B. The upper die 112A and the lower die 112B have a first tool face 122A, or surface, and a second tool face 122B, or surface, respectively, shaped according to a desired shape of the multi-layered metallic part 131. The desired shape of the multi-layered metallic part 131 can be planar or non-planar (e.g., contoured). The upper die 112A and the lower die 112B are configured to transfer heat to and compress the multi-layered metallic assembly 130. Generally, the heat and compression applied to the multi-layered metallic assembly 130 by the upper die 112A and the lower die 112B help diffusion bond together the multiple layers of the multi-layered metallic assembly 130 to form the multi-layered metallic part 131 as described below. Of course, in other examples of a system for forming the multi-layered metallic assembly 130 into a part, the system does not include electromagnetic coils and the multi-layered metallic assembly 130 can be heated by other means, such as an autoclave, oven, external heaters, and the like.

Referring to FIGS. 2-4, 6, and 7 the multi-layered metallic assembly 130 includes at least two metallic layers 134 arranged in a stacked formation (e.g., stacked together). An interface is defined between adjoining metallic layers 134 of the multi-layered metallic assembly 130. The at least two metallic layers 134 are pre-formed prior to being arranged in the stacked formation. According to one example, the metallic layers 134 of the multi-layered metallic assembly 130 include at least one high-strength layer and at least one ductile layer. In the same or an alternative example, the metallic layers 134 of the multi-layered metallic assembly 130 include at least two ductile layers. According to the illustrated example, the multi-layered metallic assembly 130 includes at least one high-strength layer 135 sandwiched between a pair of outer ductile layers 133A. In other words, at least one high-strength layer 135 is interposed indirectly or directly between two outer ductile layers 133A. The outer ductile layers 133A define outer surfaces 132A, 132B of the multi-layered metallic assembly 130.

Figure 2:
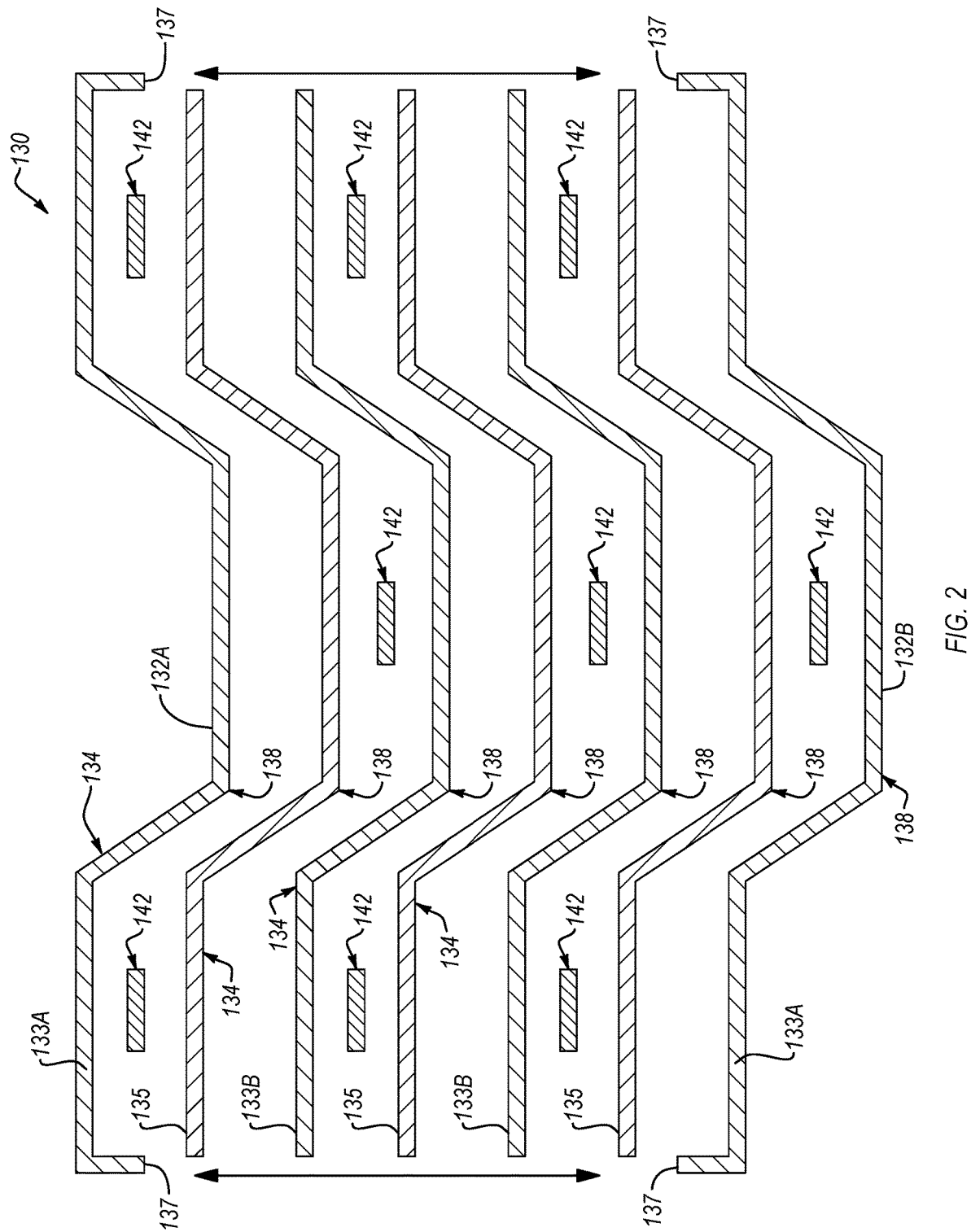
FIG. 2 is an exploded cross-sectional side elevation view of a multi-layered metallic assembly, according to one or more examples of the present disclosure.
Figure 3:
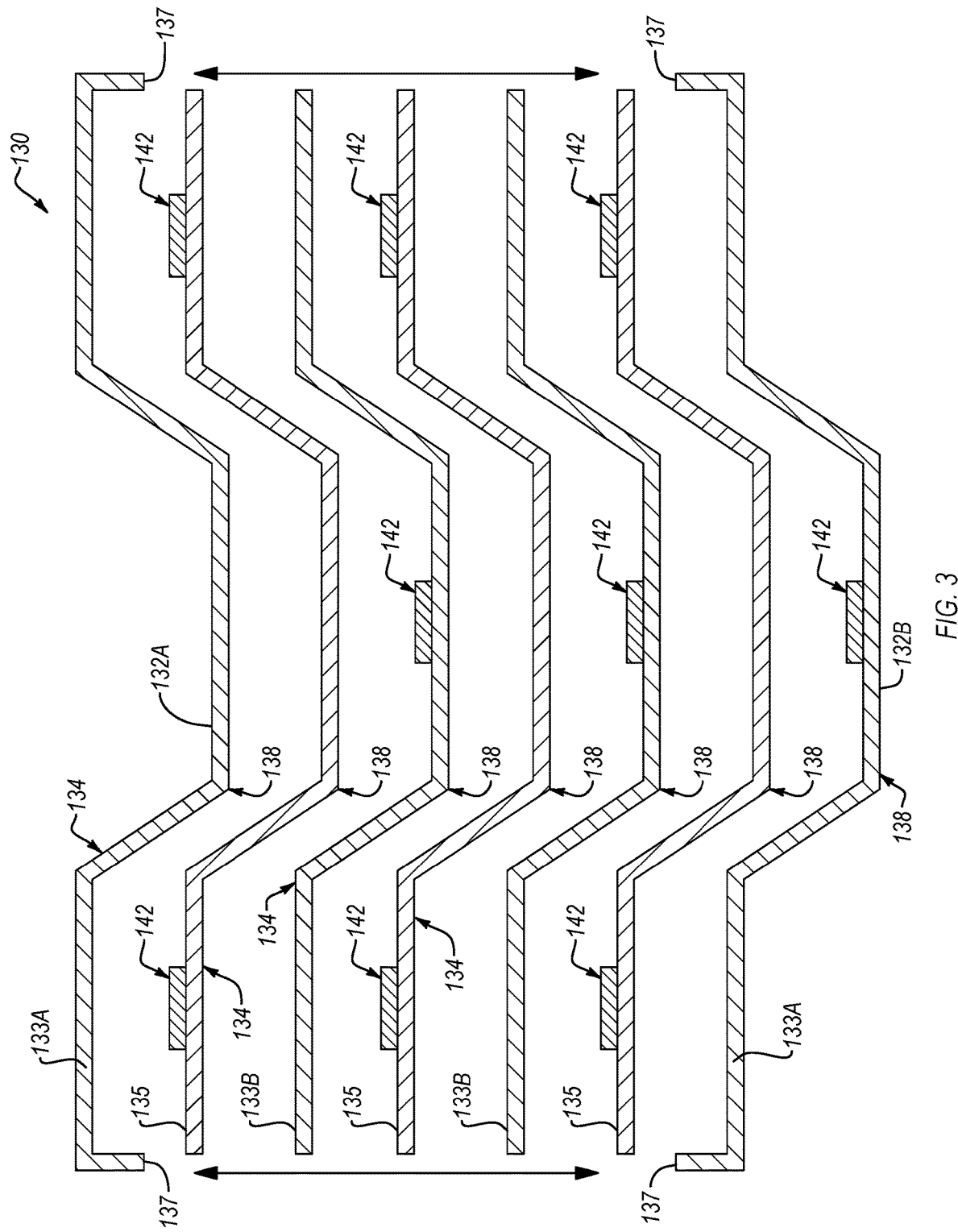
FIG. 3 is an exploded cross-sectional side elevation view of another multi-layered metallic assembly, according to one or more examples of the present disclosure.
Figure 4:
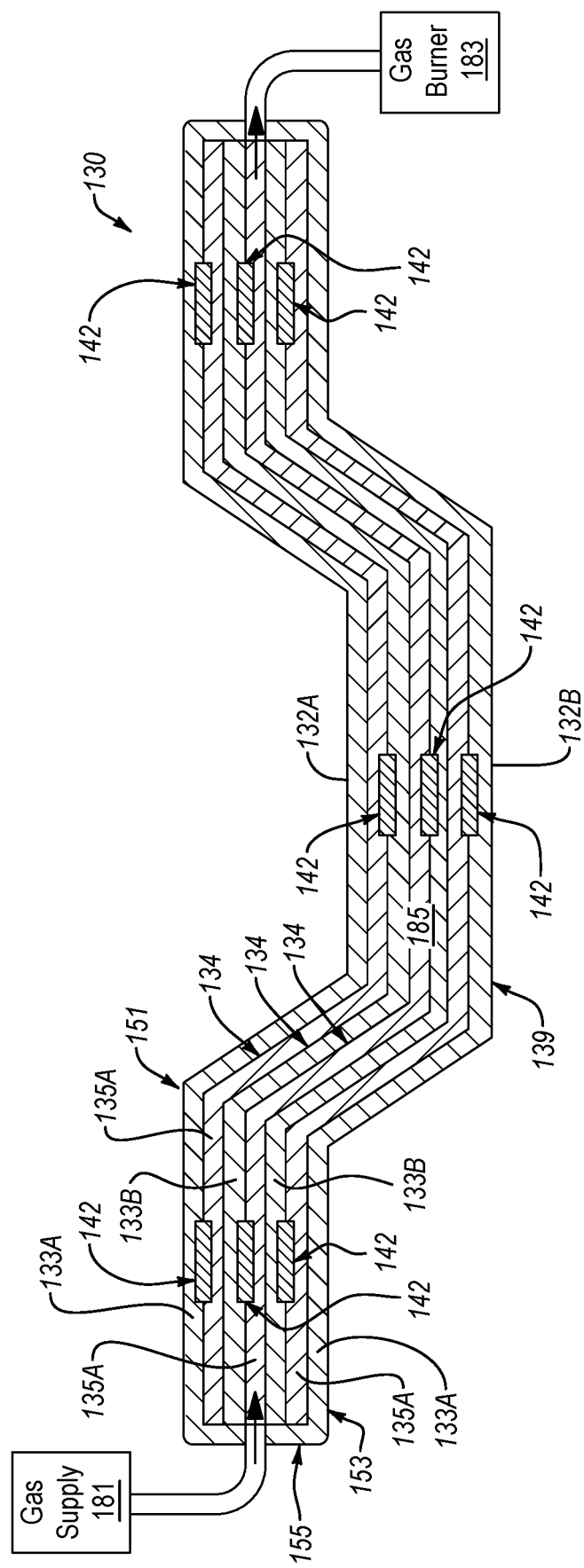
FIG. 4 is a cross-sectional side elevation view of the multi-layered metallic assembly of either FIG. 2 or FIG. 3, shown undergoing a formation process, according to one or more examples of the present disclosure.
Figure 6:
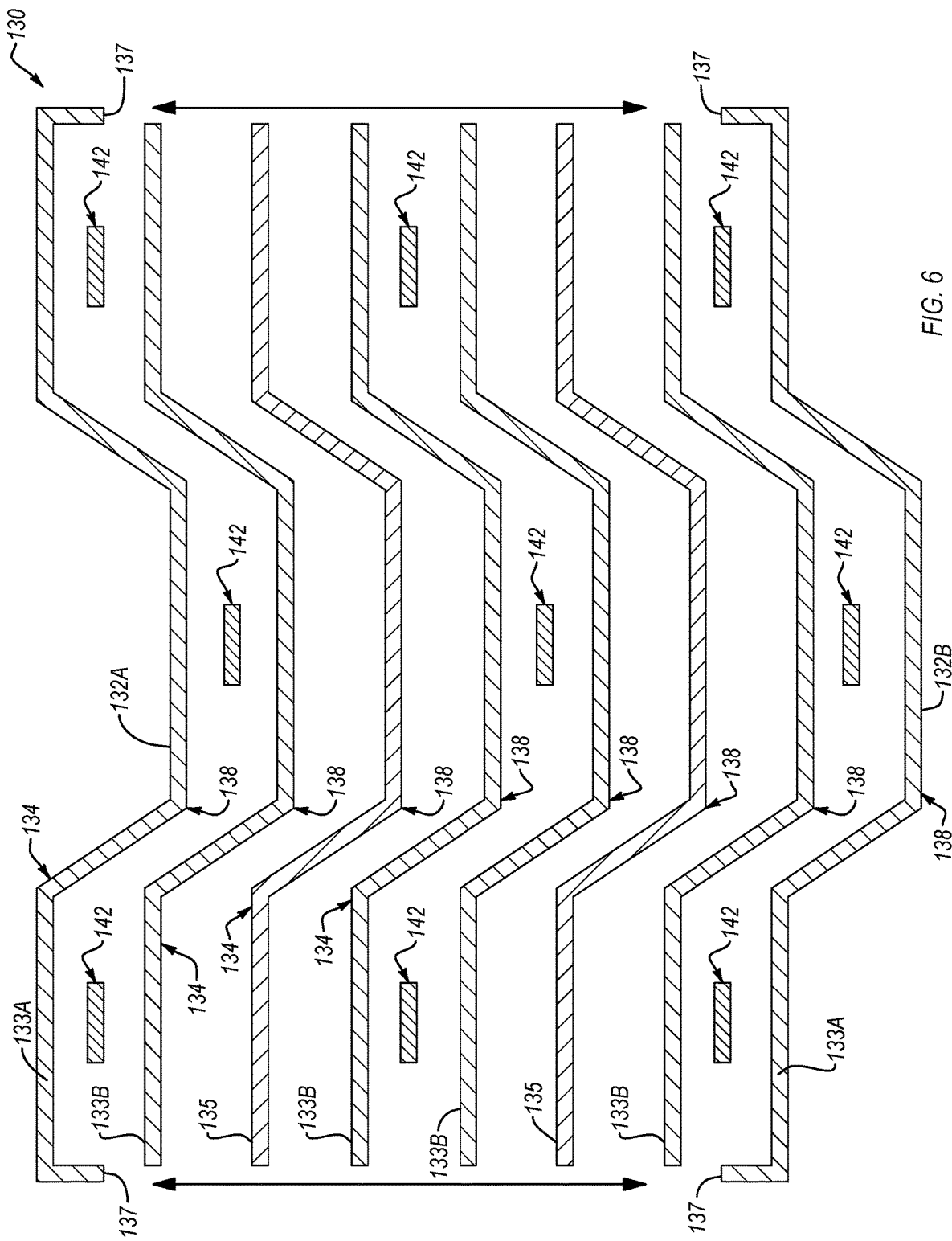
FIG. 6 is an exploded cross-sectional side elevation view of a multi-layered metallic assembly, according to one or more examples of the present disclosure.
Figure 7:
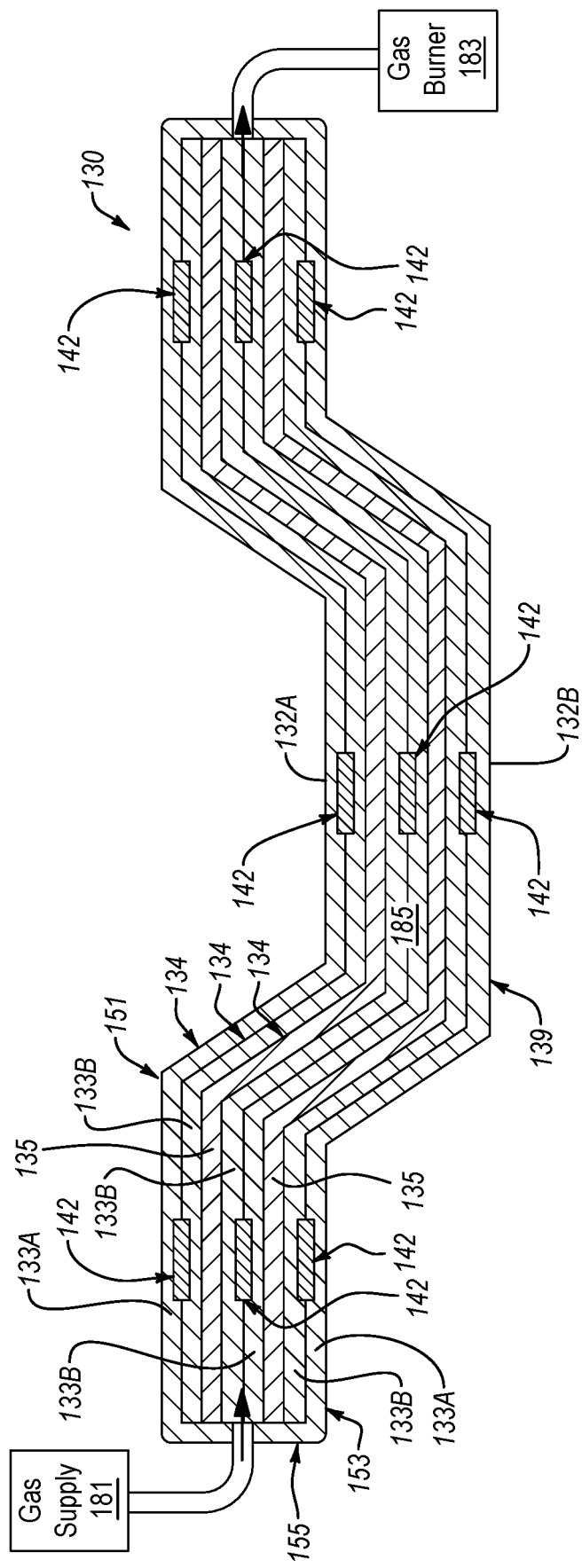
FIG. 7 is a cross-sectional side elevation view of the multi-layered metallic assembly of FIG. 6, shown undergoing a formation process, according to one or more examples of the present disclosure.

In some implementations, such as shown in FIGS. 2-4, the multi-layered metallic assembly 130 includes at least two high-strength layers 135, two outer ductile layers 133A, and at least one inner ductile layer 133B. For example, in FIGS. 2-4, the multi-layered metallic assembly 130 includes three high-strength layers 135, two outer ductile layers 133A, and two inner ductile layers 133B. Each of the three high-strength layers 135 is sandwiched, or interposed, directly between two adjacent ductile layers (e.g., between an outer ductile layer 133A and an inner ductile layer 133B or between two inner ductile layers 133B). Accordingly, in certain implementations, the multi-layered metallic assembly 130 includes alternating ductile layers and high-strength layers. However, in alternative examples, as shown in FIG. 6, the multi-layered metallic assembly 130 includes at least two ductile layers stacked adjacent to each other. For example, in such a configuration, each outer ductile layer 133A may be directly adjacent an inner ductile layer 133B, and two inner ductile layers 133B may be directly adjacent each other. The two back-to-back ductile layers can have the same ductility or different ductilities.

The ductile layers 133A, 133B of the multi-layered metallic assembly 130 are made of a material having a higher ductility than the material of the high-strength layers 135 of the multi-layered metallic assembly 130. For example, in one implementation, each one of the high-strength layers 135 is made of steel (e.g., steel alloy) and each one of the outer ductile layers 133A and the inner ductile layers 133B is made of steel having a ductility greater than the steel of the high-strength layers 135. Additionally, the high-strength layers 135 of the multi-layered metallic assembly 130 are made of a material that is stronger and harder than the material of the outer ductile layers 133A and the inner ductile layers 133B of the multi-layered metallic assembly 130. For example, in one implementation, each one of the outer ductile layers 133A and the inner ductile layers 133B is made of steel and each one of the high-strength layers 135 is made of a steel having a higher yield strength and hardness than the steel of the ductile layers.

According to one implementation, the high-strength layers 135 are made of any of various high-strength or high-carbon steels, such as, but not limited to high-hardness armor steel and/or homogenous armor steel. For example, in some implementations, the high-strength layers 135 are made from a material having one or more (e.g., all) of the properties within the ranges listed in Table 1. In one implementation, the high-strength layers 135 are made from a material having one or more (e.g., all) of the properties of the example listed in Table 1. The properties listed in Table 1 include hardness, yield strength, ultimate tensile strength (UTS), and absorbed energy during a standard Charpy impact test (or, Charpy KV) (e.g., at −40° transversal to rolling direction).

TABLE 1

|  | Hardness | Yield Strength | | UTS | | Elongation | Charpy KV | |
| --- | --- | --- | --- | --- | --- | --- | --- | --- |
|  | HB | MPa | ksi | MPa | ksi | 5d(%) | J | ft. lbs |
| Range | 477-534 | ≥1100 | ≥160 | ≥1600 | ≥232 | >≥9 | ≥16 | ≥12 |
| Example | 495 | 1300 | 189 | 1700 | 247 | 12 | 28 | 21 |

In the context of protective armor for blocking explosive rounds, alternating ductile and high-strength metallic layers helps to fracture and capture the explosive rounds. For example, the high-strength metallic layers may assist in fracturing and/or otherwise absorbing the force of the explosive round, such as by fracturing responsive to the impact of the round, and the ductile metallic layers assist in capturing and/or containing the fractured pieces of the explosive round and/or the fractured high-strength metallic layers.

According to one example, each layer of the multi-layered metallic assembly 130 is separately pre-formed and subsequently stacked together to form the multi-layered metallic assembly 130. For example, in some implementations, the ductile layers 133A, 133B of the multi-layered metallic assembly 130 are pre-formed into a desired shape and to have desired crystallographic phase characteristics using various conventional metal forming techniques, such as rolling, extruding, die forming, forging, and the like. Because the ductile layers 133A, 133B are made of a relatively ductile metallic material, the ductile layers 133A, 133B can be fully consolidated when pre-formed using such metal forming techniques. However, in some examples, because the high-strength layers 135 are made from a less ductile, high-strength metallic material, conventional metal forming techniques may not be capable of forming the high-strength layers 135 when fully consolidated. Accordingly, each high-strength layer 135 of the multi-layered metallic assembly 130 may be only partially consolidated when pre-formed and stacked with the ductile layers 133A, 133B to form the multi-layered metallic assembly 130.

According to some implementations, the metallic material of each high-strength layer 135 of the multi-layered metallic assembly 130 is a powder or powdered metallic material (e.g., high-carbon steel powder, such as 0.80% carbon steel) that is partially consolidated. In one implementation, each high-strength layer 135 of the multi-layered metallic assembly 130 is between 30% and 80% consolidated. Complete consolidation of partially consolidated metallic materials of the high-strength layers 135 can be performed as the high-strength layers 135 are diffusion bonded to the ductile layers 133A, 133B. In some examples, the system 100 of FIG. 1 utilizes the electromagnetic coils 114A, 114B to produce magnetic fields that change the deformation properties of the metallic material in a way that promotes consolidation after the multi-layered metallic assembly 130 is formed and while the multi-layered metallic part 131 is formed. More specifically, the electromagnetic coils 114A, 114B can be operable to supply pulses of non-oscillating magnetic fields to the high-strength layers 135 to change the ductility and/or yield stress characteristics of the high-strength layers 135 by oscillating the crystallographic phase of the high-strength layers 135 between at least two crystallographic phases. Oscillation between crystallographic phases promotes superplasticity of the high-strength layers 135, which helps to consolidate the high-strength layers 135, such as when the high-strength layers 135 are made of a powdered metallic material. Superplasticity of the high-strength layers 135 develops due to the oscillation of the volume of the high-strength layers that occurs as the high-strength layers 135 oscillate between crystallographic phases.

The metallic layers 134 of the multi-layered metallic assembly 130 can have corresponding three-dimensional (3-D) sub-features in some implementations, such as shown at 138 in FIGS. 2-4, such that when the layers 134 are stacked together, the 3-D sub-features 138 collectively form a 3-D feature 139 of the multi-layered metallic assembly 130 and ultimately of the multi-layered metallic part 131. The 3-D feature 139 may take the form of various features having a surface shape that is non-planar, such as, for example, a protrusion, bend, channel, bevel, indentation, and the like.

According to certain implementations, the high-strength layers 135 of the multi-layered metallic assembly 130 are self-supportive and formed separately from the ductile layers 133A, 133B. In other words, in such implementations, the high-strength layers 135 of the multi-layered metallic assembly 130 may not need the support of the ductile layers 133A, 133B to form a desired pre-form shape. Self-supportive high-strength layers 135 can be pre-formed into a desired shape using various metal forming techniques, such as cold compression, additive manufacturing, and the like. In some examples, such as those in which the high-strength layers of the multi-layered metallic assembly 130 are made of a powdered metallic material, each high-strength layer 135 of the multi-layered metallic assembly 130 can include a binder material (e.g., adhesive, glue, etc.) that helps maintain the shape of the powdered material before and during the stacking of the ductile layers and high-strength layers together to form the multi-layered metallic assembly 130. The binder material can be removed from the high-strength layers 135, such as by heating and evaporating the binding material.

As shown in FIGS. 2-4, in some examples, the separately pre-formed ductile layers 133A, 133B and the high-strength layers 135 are stacked together in an alternating arrangement. In the embodiment shown in FIGS. 2-4, the outer ductile layers 133A are joined together at respective ends 137 that encompass the outer edges of the other layers 134, and form sides 155 of the resulting multi-layered metallic part 131. In such an embodiment, the ends 137 can be joined together, such as via welding, to seal the ends 137 together and define an enclosed interior cavity 185 of the multi-layered metallic assembly 130 between the outer ductile layers 133A. In this manner, the inner ductile layers 133B and the high-strength layers 135 are sealingly enclosed within the interior volume 185. In some implementations, as shown, one or more gas supply lines and one or more excess gas lines can be situated between the ends 137 of the outer ductile layers 133A and open to the interior cavity 185. The ends 137 of the outer ductile layers 133A can be sealed against the gas supply line(s) and excess gas line(s) to maintain the sealed enclosure of the interior cavity 185. The gas supply line(s) can be coupled to a gas supply 181 that, during an oxide reduction process, supplies a gas (e.g., hydrogen, argon, etc.) to the gas supply line(s) for introducing the gas into the interior cavity 185. When the gas is flammable, such as hydrogen gas, the excess gas line(s) can be coupled to a gas burner 183 that, during the oxide reduction process, burns gas received from the interior cavity 185 via the excess gas line(s). In other implementations, instead of burning the gas, such as when the gas is a non-flammable gas (e.g., argon), the gas may be vented to atmosphere.

In some examples, the high-strength layers 135 of the multi-layered metallic assembly 130 are not self-supportive. Instead, in certain implementations, the high-strength layers 135 are made of a powdered metallic material that can be supported in a desired pre-form shape by the ductile layers 133A, 133B. For example, the ductile layers 133A, 133B can be arranged in a spaced apart manner (i.e., without the high-strength layers 135) so that open spaces are defined between the adjacent ductile layers 133A, 133B. The powdered material can then be poured, or otherwise delivered, into the open spaces between the ductile layers 133A, 133B to form the high-strength layers 135. After the powdered material is delivered into the open spaces to form the high-strength layers 135, the ends 137 of the outer ductile layers 133A can be sealed together to form an enclosure as described previously.

The shape of the multi-layered metallic assembly 130 corresponds with the shape of the multi-layered metallic part 131. For example, in some implementations, the multi-layered metallic assembly 130 has the same shape or the near net shape of the multi-layered metallic part 131. Accordingly, in certain examples, the multi-layered metallic assembly 130 undergoes only a nominal change or no change in shape when formed into the multi-layered metallic part 131 as described in more detail below. Generally, substantial reshaping of consolidated high-strength materials for armor is difficult to achieve. But, in these examples, because the multi-layered metallic assembly 130 has essentially the same shape as the desired shape of the multi-layered metallic part 131, the high-strength layers 135 of the multi-layered metallic assembly 130 can be formed into the multi-layered metallic part 131 (and consolidated in some examples) without substantial reshaping of the high-strength layers 135. As shown, an interface (e.g., a distinct boundary) is defined between each high-strength layer 135 and an adjacent ductile layer 133A, 133B. Moreover, because substantial shaping of the individual layers of the multi-layered metallic assembly 130, having non-planar, contoured, or complex shapes, is relatively easy to achieve, a multi-layered metallic assembly 130, and thus a multi-layered metallic part 131, with non-planar, contoured, or complex shapes (see, e.g., the 3-D feature 139 of FIG. 5) and high-strength steel layers, can be formed with less difficulty compared to previous methods.

Referring again to FIGS. 2-4, the multi-layered metallic assembly 130 further includes at least one diffusion-bond preventing element 142 that is positioned directly between adjacent metallic layers of the multi-layered metallic assembly 130. In other words, the diffusion-bond preventing element 142 is located within an interface defined between adjacent metallic layers of the multi-layered metallic assembly 130. In some examples, the multi-layered metallic assembly 130 includes a plurality of diffusion-bond preventing elements 142 directly between the same adjacent metallic layers or different adjacent metallic layers of the multi-layered metallic assembly 130. As used herein, a diffusion-bond preventing element 142 is directly between adjacent metallic layers when the diffusion-bond preventing element 142 is contiguous with (e.g., contacts) both of the adjacent metallic layers. In other words, a location, contiguous with the diffusion-bond preventing element 142, is defined on the adjacent metallic layers.

Each diffusion-bond preventing element 142 is located at any of various locations between an adjacent two of the metallic layers of the multi-layered metallic assembly 130. For example, referring to FIG. 2, each one of at least some diffusion-bond preventing elements 142 are interposed directly between a high-strength layer 135 and a ductile layer (e.g., one of an outer ductile layer 133A or an inner ductile layer 133B). Alternatively, referring to FIG. 6, some diffusion-bond preventing elements 142 are interposed directly between two ductile layers. For example, in FIG. 6, some diffusion-bond preventing elements 142 are interposed directly between an outer ductile layer 133A and an inner ductile layer 133B, and some diffusion-bond preventing elements 142 are interposed directly between two inner ductile layer 133B. Accordingly, in certain examples, multiple diffusion-bond preventing elements 142 are interposed directly between the same high-strength layer 135 and ductile layer. These multiple diffusion-bond preventing elements 142 are spaced apart from each other along an interface between the high-strength layer 135 and the ductile layer.

In certain examples, the multiple diffusion-bond preventing elements 142 of a multi-layered metallic assembly 130 are staggered, from layer interface to layer interface, across a thickness of the multi-layered metallic assembly 130. In other words, in a thickness direction (i.e., a direction across a thickness of the multi-layered metallic assembly 130 or perpendicular to the interfaces between the metallic layers of the multi-layered metallic assembly 130) no two diffusion-bond preventing elements 142, located between directly adjacent interfaces of the metallic layers, overlap. Such a staggered configuration may direct the propagation of cracks, caused by a projectile impacting the multi-layered metallic part 131, through the high-strength layers 135 of the multi-layered metallic part 131, which promotes containment of the cracks and the corresponding energy of the impact to within the multi-layered metallic part 131.

The diffusion-bond preventing element 142 (e.g., each one of the diffusion-bond preventing elements 142), in some examples, includes a thermally insulating material 138. In such examples, the thermally insulating material 138 is configured to reduce the temperature of the adjacent metallic layers, during the heating of the multi-layered metallic assembly 130 to form the multi-layered metallic part 131, at a location contiguous with the thermally insulating material. The reduction in temperature helps to prevent diffusion bonding between the adjacent metallic layers at the location of the diffusion-bond preventing element 142. In other words, the diffusion-bond preventing element 142, in effect, acts as a stop-off or block to prevent diffusion bonding to occur between the adjacent metallic layers. According to one example, the thermally insulating material 138 includes a ceramic material or at least one of boron nitride and yttrium oxide. Suitable ceramic materials include one or more ceramic agents that provide high temperature barriers that inhibit diffusion bonding. In certain examples, the ceramic agents are chemically inert and do not deteriorate at high temperatures.

Figure 11:
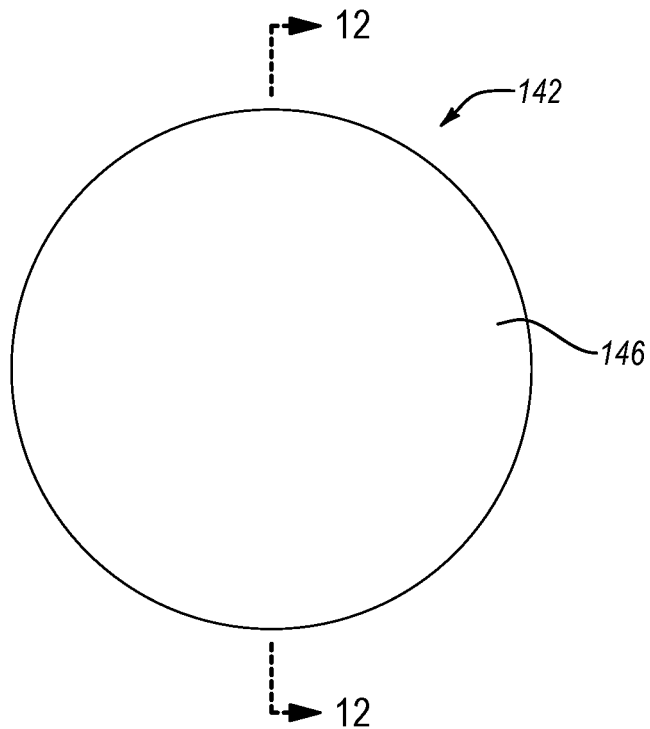
FIG. 11 is a top plan view of a diffusion-bond preventing element, according to one or more examples of the present disclosure.
Figure 12:
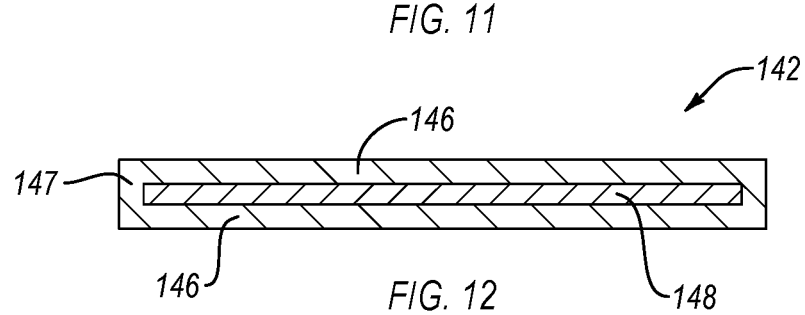
FIG. 12 is a cross-sectional side elevation view of the diffusion-bond preventing element according to FIG. 11, taken along the line 12-12 of FIG. 11, according to one or more examples of the present disclosure.

The thermally insulating material 138 can be applied or positioned by any suitable method. In some examples, the thermally insulating material 138 can be printed or applied directly onto one of the adjacent metallic layers. In other examples, such as shown in FIGS. 11 and 12, the thermally insulating material 138 is encapsulated within a metallic housing 146. The metallic housing 146 is made of a metallic material, such as sheet metal, in some examples. In some implementations, the metallic housing 146 includes two opposing broad-faced sheets that are welded together along an outer edge of the sheets. The thermally insulating material 138 is interposed between the sheets of the metallic housing 146. In certain examples, the metallic housing 146 is welded to one of the adjacent metallic layers.

The diffusion-bond preventing element 142 can have any of various shapes and sizes. However, in some preferred examples, the diffusion-bond preventing element 142 has a thickness substantially smaller than its length or width. For example, in one implementation, the diffusion-bond preventing element 142 is shaped like a disk. As shown in FIG. 11, the disk has a circular-shaped outer periphery or edge. However, in other examples, the outer periphery or edge of the disk has a shape other than circular, such as any of various regular shapes (e.g., square, rectangular, triangular, and the like). Also, as shown in FIGS. 2 and 3, the diffusion-bond preventing element 142 is smaller (e.g., has a smaller footprint than) any one of the adjacent metallic layers between which the diffusion-bond preventing element 142 is interposed. This allows the portions of the adjacent metallic layers around the diffusion-bond preventing element 142 to be diffusion bonded to each other. In some examples, a shape of one or more of the diffusion-bond preventing elements 142, and corresponding non-diffusion-bonded regions 144, is one of various complex contoured shapes or geometries that enhance the structural or dynamic performance of the multi-layered metallic part 131 by providing a complex separation surface between layers of the multi-layered metallic part 131.

Figure 14:
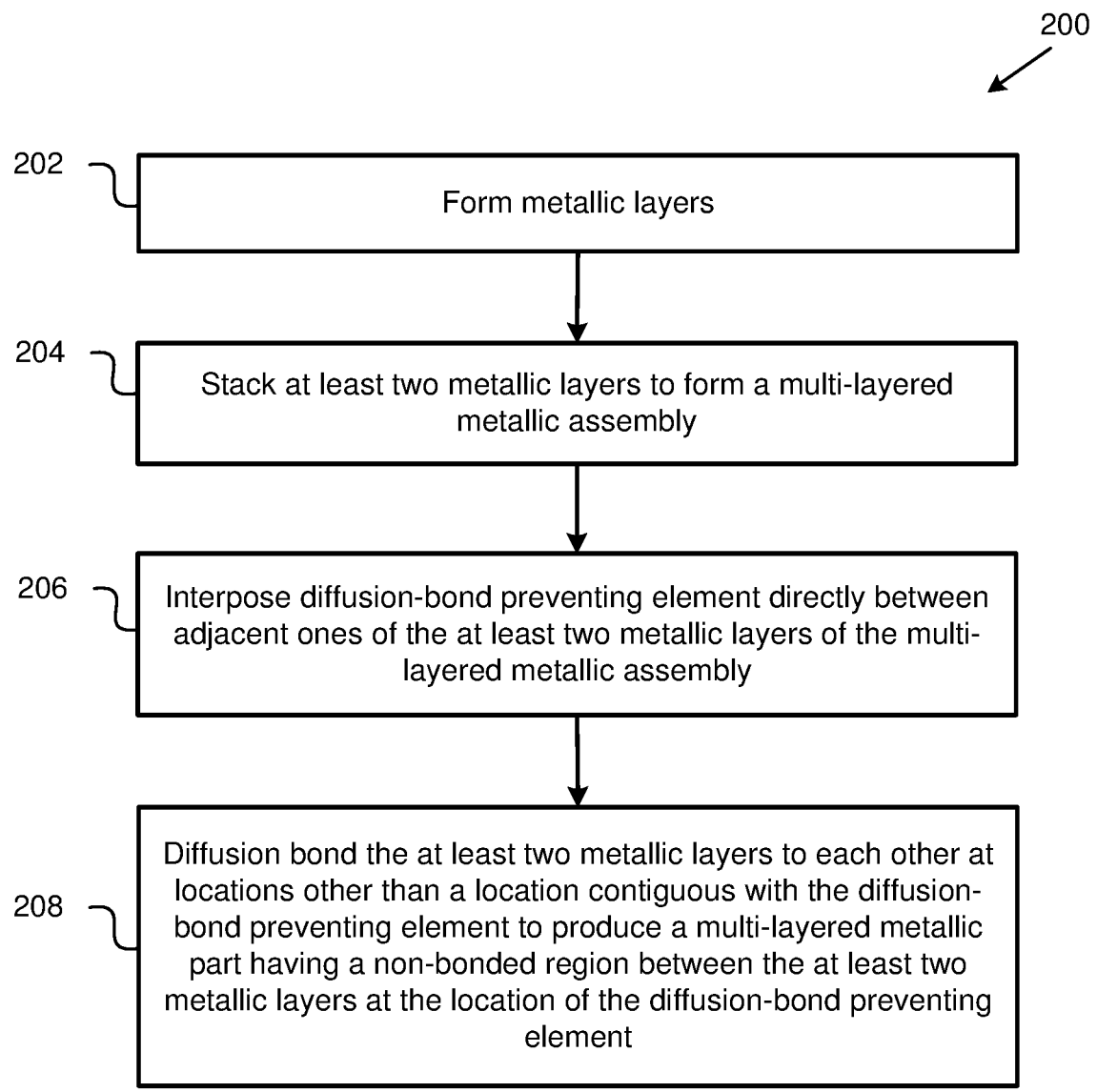
FIG. 14 is a schematic flow diagram of a method of forming a multi-layered metallic part, according to one or more examples of the present disclosure.

Referring to the method 200 of FIG. 14, the multi-layered metallic assembly 130 is formed by executing block 202 to block 206 of the method 200. Block 202 includes forming metallic layers, which can be separately formed ductile layers and high-strength layers. The metallic layers are made of a metallic material. Block 204 of the method 200 includes stacking at least two metallic layers. Block 206 includes interposing a diffusion-bond preventing element 142 directly between at least two adjacent ones of the at least two metallic layers to complete the multi-layered metallic assembly 130. In one example, as shown in FIG. 2, the diffusion-bond preventing element 142 is placed between the adjacent metallic layers without pre-attaching the diffusion-bond preventing element 142 to any one of the adjacent metallic layers. In other words, the adjacent layers are simply laid up with the diffusion-bond preventing element 142 loosely placed onto one of the adjacent metallic layers.

However, to ensure proper positioning of the diffusion-bond preventing element 142 during the assembly process, in certain examples, and with further reference to FIG. 3, the step of interposing the diffusion-bond preventing element at block 206 includes attaching the diffusion-bond preventing element 142 to one of the adjacent metallic layers before stacking the adjacent layers onto each other. In some examples, attaching the diffusion-bond preventing element 142 includes pre-bonding the diffusion-bond preventing element 142 to one of the two adjacent metallic layers. Pre-bonding includes welding (e.g., tack welding) the diffusion-bond preventing element 142 to the surface of one of the adjacent metallic layers in one example. Pre-bonding includes adhering (e.g., gluing) the diffusion-bond preventing element 142 to the surface of one of the adjacent metallic layers in another example. In yet a further example, pre-bonding includes printing the diffusion-bond preventing element 142 onto one of the adjacent metallic layers. Printing the diffusion-bond preventing element 142 can include any of various lithographic or masking techniques.

Figure 5:
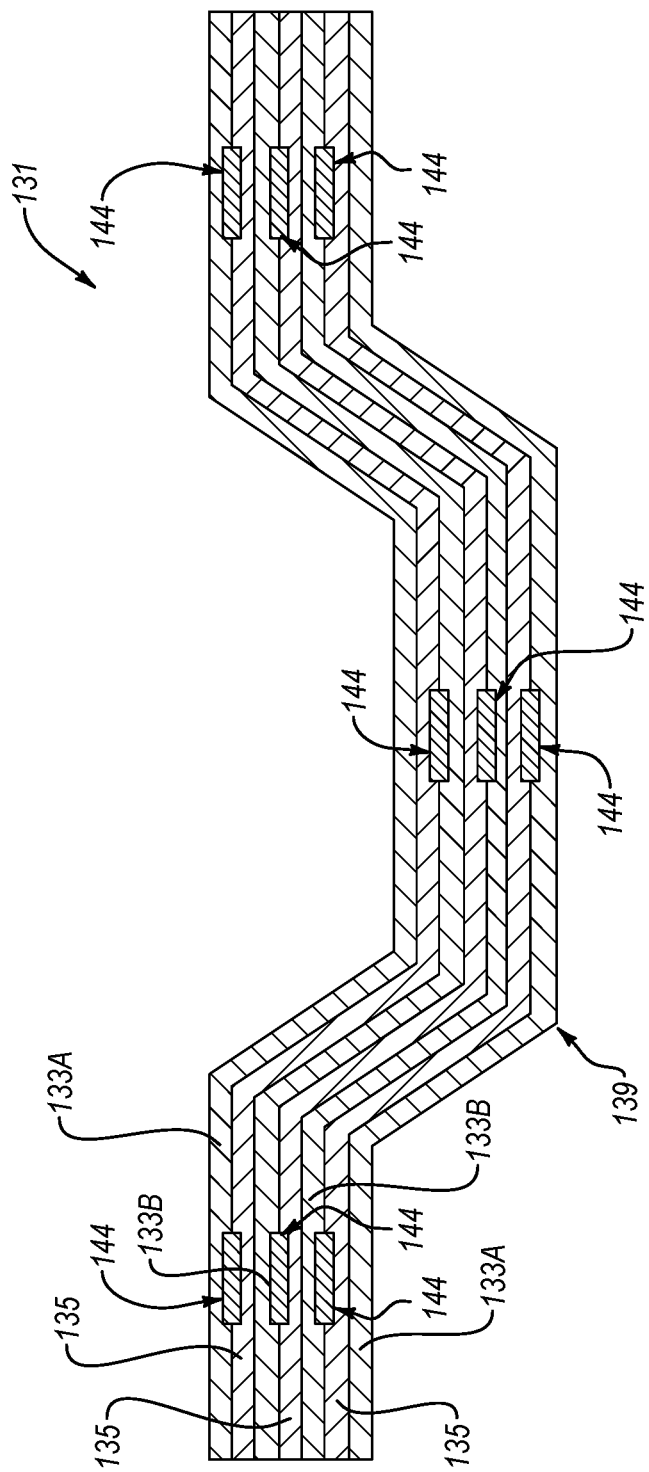
FIG. 5 is a cross-sectional side elevation view of a multi-layered metallic part, formed from the multi-layered metallic assembly of FIG. 4, according to one or more examples of the present disclosure.

Once the multi-layered metallic assembly 130 formed according to blocks 202-206 of the method 200, the metallic layers of the multi-layered metallic assembly 130 is diffusion bonded, at block 208 of the method 200, to form the multi-layered metallic part 131. As mentioned above, diffusion bonding is accomplished by applying heat and compression to the multi-layered metallic assembly 130. More specifically, block 208 includes diffusion bonding together the at least two metallic layers of the multi-layered metallic assembly 130 at locations other than a location contiguous with the diffusion-bond preventing element 142. This action produces the multi-layered metallic part 131 having a non-bonded region between the at least two metallic layers at the location of the diffusion-boned preventing element 142. Although not shown in the method 200, in some examples, after diffusion bonding together the at least two metallic layers of the multi-layered metallic assembly 130, excess portions of the outer ductile layers 133A from the multi-layered metallic part 131 can be trimmed. For example, in one implementation, the sides 155 of the outer ductile layers 133A can be removed to form a finished multi-layered metallic part 131 as shown in FIG. 5.

The method 200 produces a multi-layered metallic part 131 that includes multiple diffusion bonded metallic layers. In one example, the multi-layered metallic part 131 includes alternating ductile layers 133A, 133B and high-strength layers 135 (see, e.g., FIG. 5). However, in another example, the multi-layered metallic part 131 alternates between two ductile layers and a single high-strength layer (see, e.g., FIG. 8). In either example, the multi-layered metallic part 131 includes at least one non-diffusion-bonded region 144 directly between an adjacent two of the multiple diffusion bonded metallic layers of the multi-layered metallic part 131. The non-diffusion-bonded region 144 is defined by a corresponding diffusion-bond preventing element 142 of the multi-layered metallic assembly 130 formed into the multi-layered metallic part 131. In other words, the size, shape, and location of a diffusion-bond preventing element 142 of the multi-layered metallic assembly 130 defines the size, shape, and location of the non-diffusion-bonded region 144. As the multi-layered metallic assembly 130 is heated and compressed enough to initiate diffusion bonding between adjacent metallic layers of the multi-layered metallic assembly 130, diffusion bonding between adjacent metallic layers, at locations contiguous with the diffusion-bond preventing elements 142, is prevented. Accordingly, after the diffusion bonding process is completed and the multi-layered metallic part 131 is formed, non-diffusion-bonded regions 144 are left behind by the diffusion-bond preventing elements 142.

In those examples where the diffusion-bond preventing element 142 includes the metallic housing 146 encapsulating the thermally insulating material 148, diffusion bonding the metallic layers of the multi-layered metallic assembly 130 also diffusion bonds the metallic housing 146 to the adjacent metallic layers between which the metallic housing 156 is interposed directly between. Accordingly, as shown in FIG.

13, with the metallic housing 146, in effect, having been diffused into the adjacent metallic layers (e.g., the outer ductile layer 133A and the inner ductile layer 133B), only the thermally insulating material 148 is left behind. The thermally insulating material 148 thus defines a non-diffusion-bonded region 144 of the multi-layered metallic part 131.

Figure 13:
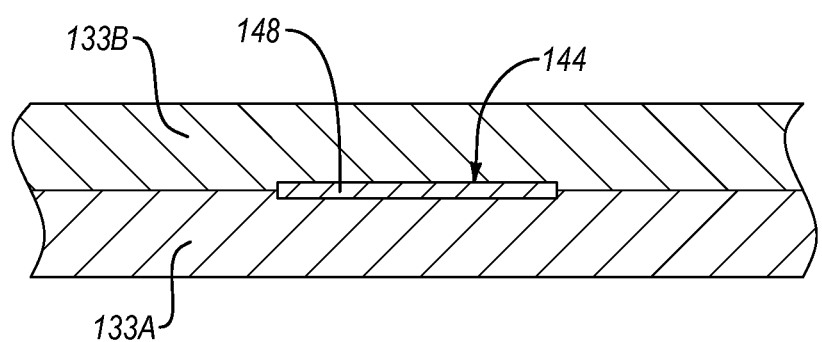
FIG. 13 is a cross-sectional side elevation view of a multi-layered metallic part, according to one or more examples of the present disclosure.

FIG. 13 also represents the non-diffusion-bonded region 144 of a multi-layered metallic part 131 defined by a diffusion-bond preventing element 142 that does not have a metallic housing 146, such as one that was adhered to or printed on one of two adjacent metallic layers. More specifically, a thermally insulating material 148 that is adhered to or printed one of the two adjacent metallic layers, without an intervening metallic housing 146, defines the non-diffusion-bonded region 144.

The non-diffusion bonded regions 144 of the multi-layered metallic part 131 help to constrain the propagation of cracks initiated by an impact from a projectile while still achieving the benefits of capturing fractured pieces of the projectile as discussed above. Constraining the propagation of cracks to within a less ductile and more high-strength material may help to dissipate the energy that is driving the crack faster as compared to allowing the crack to propagate into a more ductile and low-strength material. According to fracture mechanics theory, cracks initiated by impacts to the multi-layered metallic part 131 are more prone to pass from a high-strength layer 135 to a ductile layer 133A or 133B at a location where the high-strength layer 135 and the ductile layer 133A or 133B are diffusion bonded than where they are not. Therefore, cracks passing through a high-strength layer 135 that encounter a non-diffusion-bonded region 144 tend to be redirected back into the high-strength layer 135.

Figure 8:
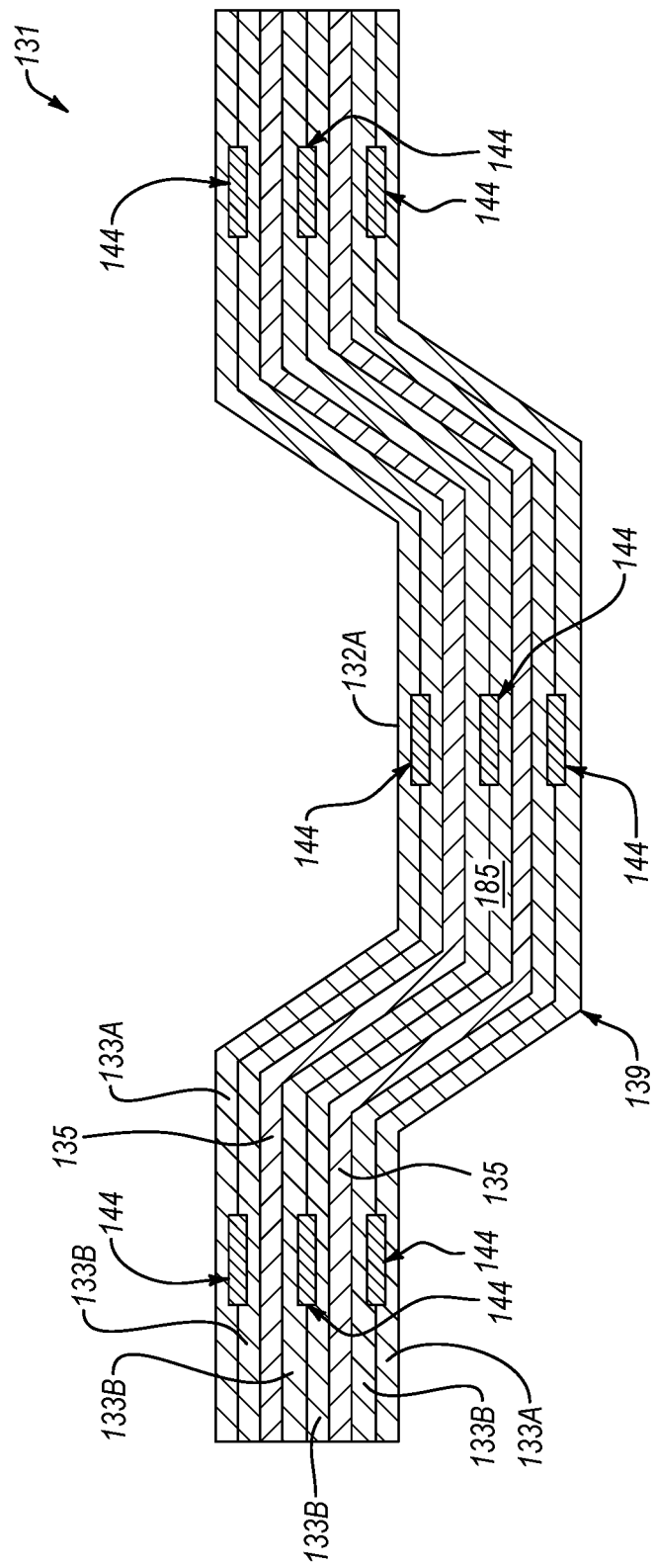
FIG. 8 is a cross-sectional side elevation view of a multi-layered metallic part, formed from the multi-layered metallic assembly of FIG. 7, according to one or more examples of the present disclosure.
Figure 9:
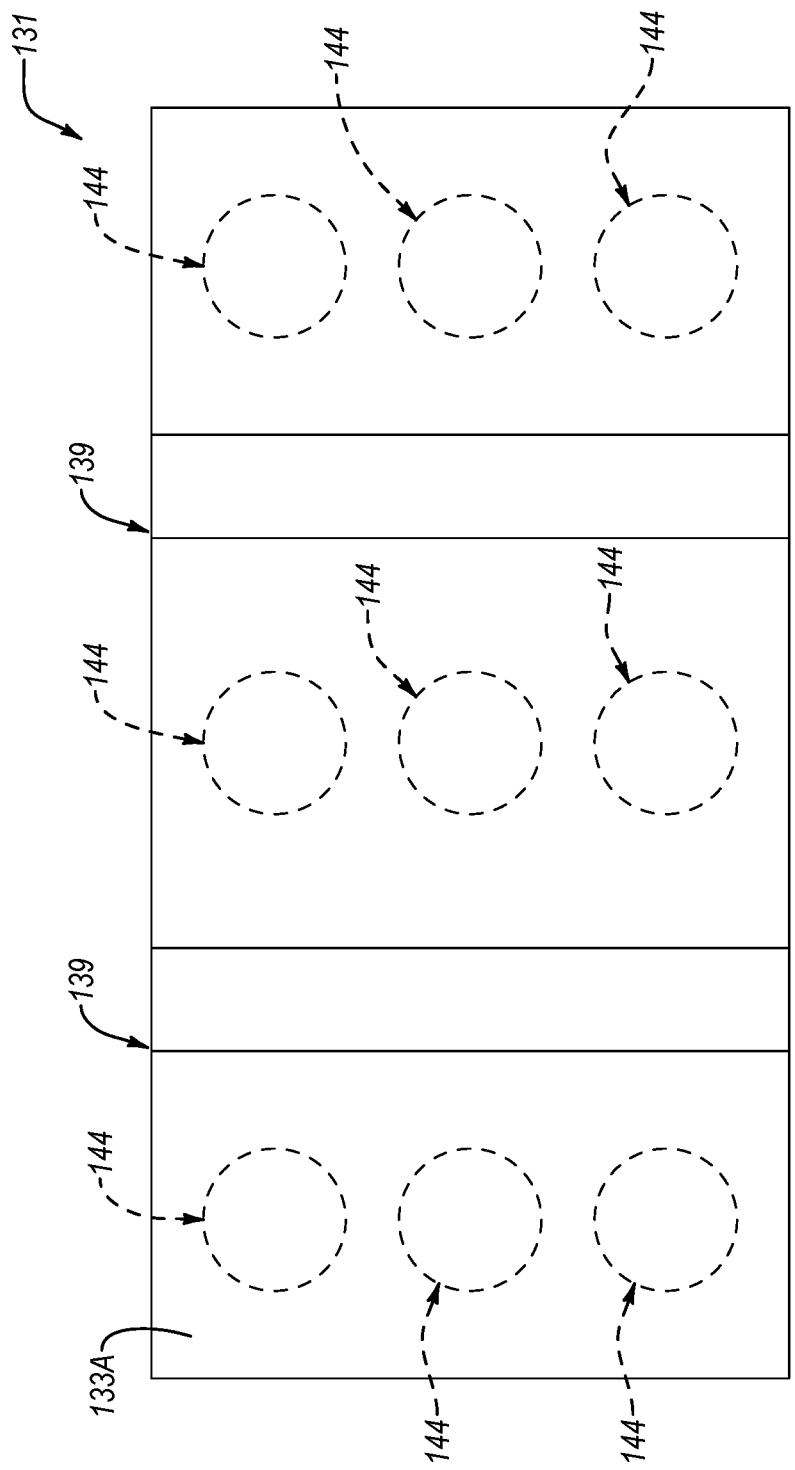
FIG. 9 is a top plan view of a multi-layered metallic part, according to one or more examples of the present disclosure.

The energy absorbed by a fracture is proportional to the area of the fracture surface. Accordingly, the energy absorbed increases as the area of the fracture surface increases. As such, to maximize the energy that can be absorbed, or dissipated, by a multi-layer metallic part 131, the pattern, spacing, and shaping of the non-diffusion-bonded regions 144 throughout the part can be selected to define one or more predetermined fracture paths having maximized fracture surface. A predetermined fracture path can be determined based on computational analysis that considers a combination of fracture modes that maximizes the fracture surface area. For example, the non-diffusion-bonded regions 144 of a multi-layer metallic part 131 can be configured to prolong the propagation of a crack through a high-strength layer 135 by redirecting the crack from one non-diffusion-bonded region 144, contiguous with the high-strength layer 135, to another non-diffusion-bonded region 144, contiguous with the high-strength layer 135. In one implementation, as shown in FIGS. 5 and 8, at least one non-diffusion-bonded region 144 is located on one side of each high-strength layer 135 and at least one non-diffusion-bonded region 144 is located on an opposite side of the same corresponding high-strength layer 135. Referring to FIG. 9, spacing the non-diffusion-bonded regions 144 apart from each other across a plane perpendicular to a width or length of the multi-layer metallic part 131 also helps to prolong the propagation of cracks through the high-strength layers 135.

Figure 10:
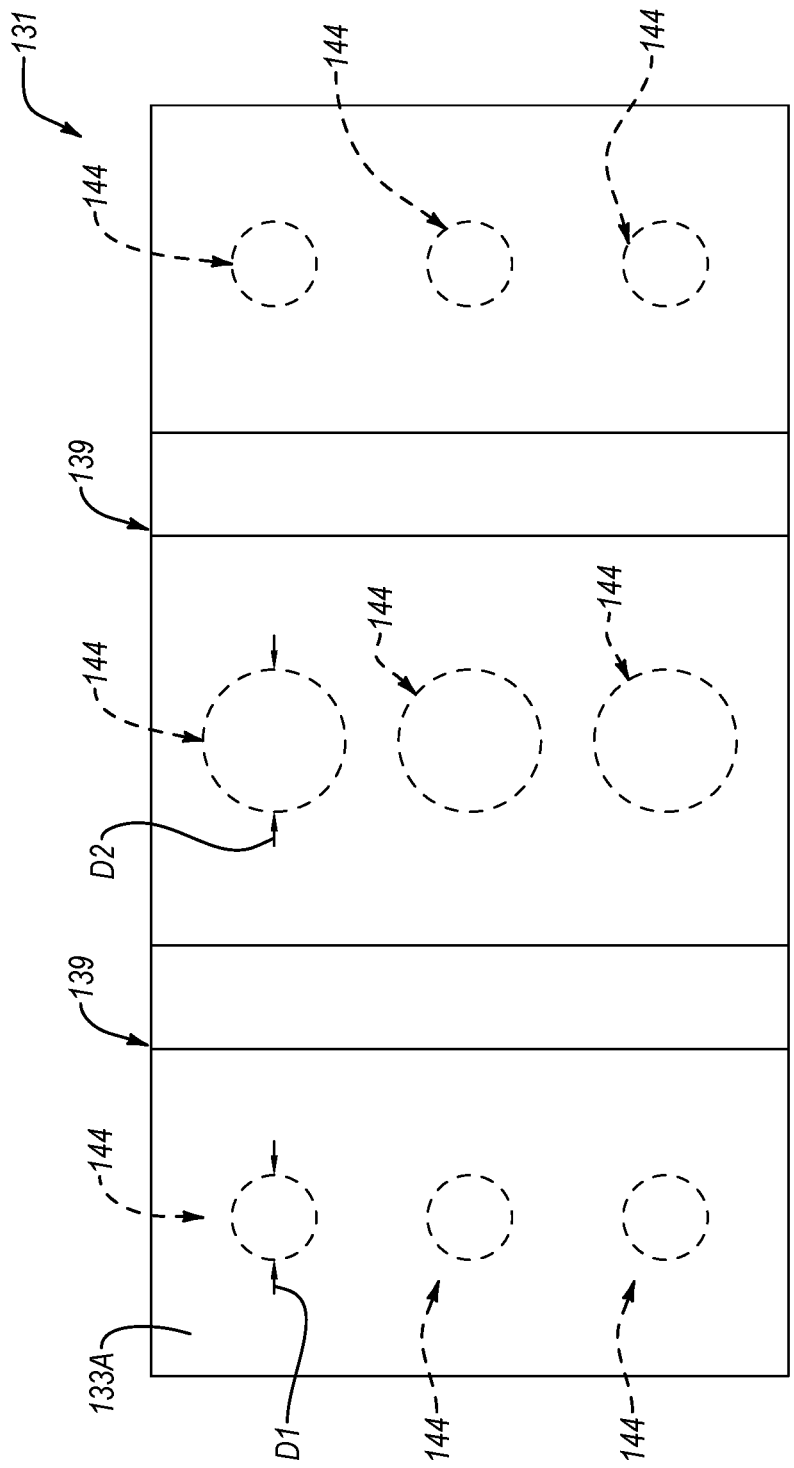
FIG. 10 is a top plan view of a multi-layered metallic part, according to one or more examples of the present disclosure.

Additionally, as shown in FIG. 10, the non-diffusion-bonded regions 144 of the multi-layer metallic part 131 can be differently sized. The size of the non-diffusion-bonded regions 144 can be sized based on their location on the part, or based on their location relative to particular features of the part. In one implementation, as an example, the non-diffusion-bonded regions 144 within a location of the multi-layer metallic part 131 that is more prone to impacts (e.g., broader faced or non-angled zones) may have larger non-diffusion-bonded regions 144 that in locations less prone to impacts (small faced or angled zones). For example, some of the non-diffusion-bonded regions 144 of the multi-layer metallic part 131 shown in FIG. 10 have a first maximum dimension D1 and others of the non-diffusion-bonded regions 144 have a second maximum dimension D2. The second maximum dimension D2 is different (e.g., greater than) the first maximum dimension D1.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of forming a multi-layered metallic part, comprising:
    stacking metallic layers, each made of a metallic material having a ductility, to form a multi-layered metallic assembly;
    interposing a diffusion-bond preventing element directly between adjacent ones of the metallic layers of a plurality of adjacent ones of the metallic layers of the multi-layered metallic assembly;
    compressing the adjacent ones of the metallic layers against the diffusion-bond preventing element to deform each one of the adjacent ones of the metallic layers around the diffusion-bond preventing element; and
    diffusion bonding each one of the plurality of adjacent ones of the metallic layers to each other at locations other than a location contiguous with the diffusion-bond preventing element, such that an entirety of a top, an entirety of a bottom, and an entirety of all sides of the diffusion-bond preventing element are completely contiguous with and completely insulated by the adjacent ones of the metallic layers and such that the adjacent ones of the metallic layers, at the location contiguous with the diffusion-bond preventing element, are not diffusion bonded to the diffusion-bond preventing element, to produce the multi-layered metallic part having a non-bonded region between the adjacent ones of the metallic layers at the location contiguous with the diffusion-bond preventing element;
    wherein the diffusion-bond preventing element between any one of the plurality of adjacent ones of the metallic layers is staggered relative to the diffusion-bond preventing element between any other one of the plurality of adjacent ones of the metallic layers such that no diffusion-bond preventing element between one of the plurality of adjacent ones of the metallic layers overlaps, in a direction across thicknesses of the metallic layers, with a diffusion-bond preventing element between a next adjacent one of the plurality of adjacent ones of the metallic layers.

2. The method according to claim 1, wherein the metallic material of the adjacent ones of the metallic layers has the same ductility.

3. The method according to claim 1, wherein:
    adjacent ones of the metallic layers of the plurality of adjacent ones of the metallic layers comprises a first metallic layer and a second metallic layer; and
    the metallic material of the second metallic layer has a lower ductility than the metallic material of the first metallic layer.

4. The method according to claim 3, wherein the second metallic layer is a high-strength layer made of a powdered metallic material.

5. The method according to claim 1, further comprising attaching the diffusion-bond preventing element to one of the metallic layers before stacking the metallic layers.

6. The method according to claim 5, wherein the step of attaching the diffusion-bond preventing element to the one of the metallic layers comprises welding the diffusion-bond preventing element to the one of the metallic layers.

7. The method according to claim 5, wherein the step of attaching the diffusion-bond preventing element to the one of the metallic layers comprises printing the diffusion-bond preventing element onto the one of the metallic layers.

8. The method according to claim 1, wherein the diffusion-bond preventing element comprises a thermally insulating material.

9. The method according to claim 8, wherein the thermally insulating material comprises one or more of boron nitride and yttrium oxide.

10. The method according to claim 8, wherein the diffusion-bond preventing element further comprises a metallic housing encapsulating the thermally insulating material.

11. The method according to claim 1, wherein the diffusion-bond preventing element is one of a plurality of diffusion-bond preventing elements, and wherein interposing the diffusion-bond preventing element comprises interposing the plurality of diffusion-bond preventing elements, spaced apart from each other, directly between the adjacent ones of the metallic layers of the plurality of adjacent ones of the metallic layers of the multi-layered metallic assembly.

12. The method according to claim 11, wherein the plurality of diffusion-bond preventing elements are arranged relative to each other according to a predetermined fracture path through at least one of the metallic layers.

13. The method according to claim 1, wherein the diffusion-bond preventing element comprises a non-metallic thermally insulating material.

14. The method according to claim 13, wherein the non-metallic thermally insulating material comprises ceramic material.

15. The method according to claim 1, wherein the diffusion-bond preventing element has a disk shape.

16. The method according to claim 1, wherein the diffusion-bond preventing element has a circular-shaped outer periphery.

17. The method according to claim 11, wherein:
at least one of the plurality of diffusion-bond preventing elements has a first maximum dimension;
at least another of the plurality of diffusion-bond preventing elements has a second maximum dimension; and
the first maximum dimension is different than the second maximum dimension.

18. The method according to claim 17, wherein:
at least a first set of the plurality of diffusion-bond preventing elements has the first maximum dimension; and
at least a second set of the plurality of diffusion-bond preventing elements has the second maximum dimension.

19. The method according to claim 18, wherein:
the at least first set of the plurality of diffusion-bond preventing elements are located in a first three-dimensional (3-D) feature of the multi-layered metallic part; and
the at least second set of the plurality of diffusion-bond preventing elements are located in a second 3-D feature of the multi-layered metallic part.

20. The method according to claim 19, wherein:
the at least first set of the plurality of diffusion-bond preventing elements are located in a first plane; and
the at least second set of the plurality of diffusion-bond preventing elements are located in a second plane that is not co-planar with the first plane.

\* \* \* \* \*